Sept. 29, 1964 P. J. GRAY 3,151,277

MODULAR ELECTRICAL DEVICE

Filed Feb. 1, 1960 3 Sheets-Sheet 1

INVENTOR.
PHILIP J. GRAY

BY

Nolte and Nolte
ATTORNEYS

Sept. 29, 1964 P. J. GRAY 3,151,277

MODULAR ELECTRICAL DEVICE

Filed Feb. 1, 1960 3 Sheets-Sheet 2

INVENTOR.
PHILIP J. GRAY

BY

Nolte and Nolte

ATTORNEYS

Sept. 29, 1964 P. J. GRAY 3,151,277

MODULAR ELECTRICAL DEVICE

Filed Feb. 1, 1960 3 Sheets-Sheet 3

INVENTOR.
PHILIP J. GRAY

BY

Nolte and Nolte
ATTORNEYS 3,151,277

MODULAR ELECTRICAL DEVICE

Philip J. Gray, Marshfield, Mass., assignor, by mesne assignments, to The Sippican Corporation, Marion, Mass., a corporation of Massachusetts Filed Feb. 1, 1960, Ser. No. 6,065
10 Claims. (Cl. 317—101)

The present invention relates to electrical wiring of complex and compact assemblies of electronic components to produce rugged miniaturized units.

This application is related to the subject matter of application Serial No. 771,042, filed October 31, 1958, now abandoned, and application Serial No. 736,529, filed May 20, 1958, now Patent No. 2,911,572.

In the above mentioned prior applications, techniques were disclosed for forming very high density electronic circuit assemblies having great strength and shock resistance and being self-supporting without the aid of a chassis or supporting panels. The assemblies were formed by first building subassemblies in suitable jigs and then wiring these subassemblies together to form a complete stick assembly. The subassemblies, in some instances, were difficult to handle and the jigs for forming them involved a considerable expense.

It is one object of the present invention to overcome the need for a costly component positioning jig.

According to the present invention the assembly, which may be in the form of a stick or flat slab, is made by clamping the lower edges of a pair of perforated insulating films or jigs in a fixed substantially parallel spaced relation. The insulating films, which may be formed of thin "Mylar," may be temporarily spread to allow the sequential insertion of the electrical components in a predetermined manner therebetween. A pattern of holes may be conveniently printed and subsequently perforated on the flexible insulating film to aid in the proper location of the components. By spreading the upper edges of the spaced insulating film, the leads of the components may be inserted through their respective film perforations in sequential fashion to build up a high density electrical package.

In this stage, wires and busses are welded to the component leads outside the films, welding being employed to reduce heating of the components and to increase reliability of the connections. The insulating jigging films then are between the components and the welds. If additional electrical interconnection between the component leads is necessary, a second perforated insulating film is applied over the previously welded wires and busses and the process repeated to complete the circuit. The films remain a part of the package and serve to hold the components and leads in position and impart a considerable amount of strength to the package prior to potting, thereby reducing the difficulty of handling the assembly. The completed assemblies may be potted into long sticks of rectangular cross section with the busses extending beyond the ends of the sticks. A plurality of such sticks may be packaged together into a two dimensional array and suitable terminal boards may be provided at the ends thereof for receiving the busses.

It is therefore an object of the invention to provide an improved jigging method for high density electrical packages.

Another object of the invention is to provide a jig made out of insulating film which remains a part of the package structure.

Still another object of the invention is to provide an insulating film jig which has printed thereon information to aid in the placement and wiring of the electrical component leads projecting therethrough.

Additional advantages and objects of the invention will become apparent from the following description and the drawings in which.

Figures 1, 2:
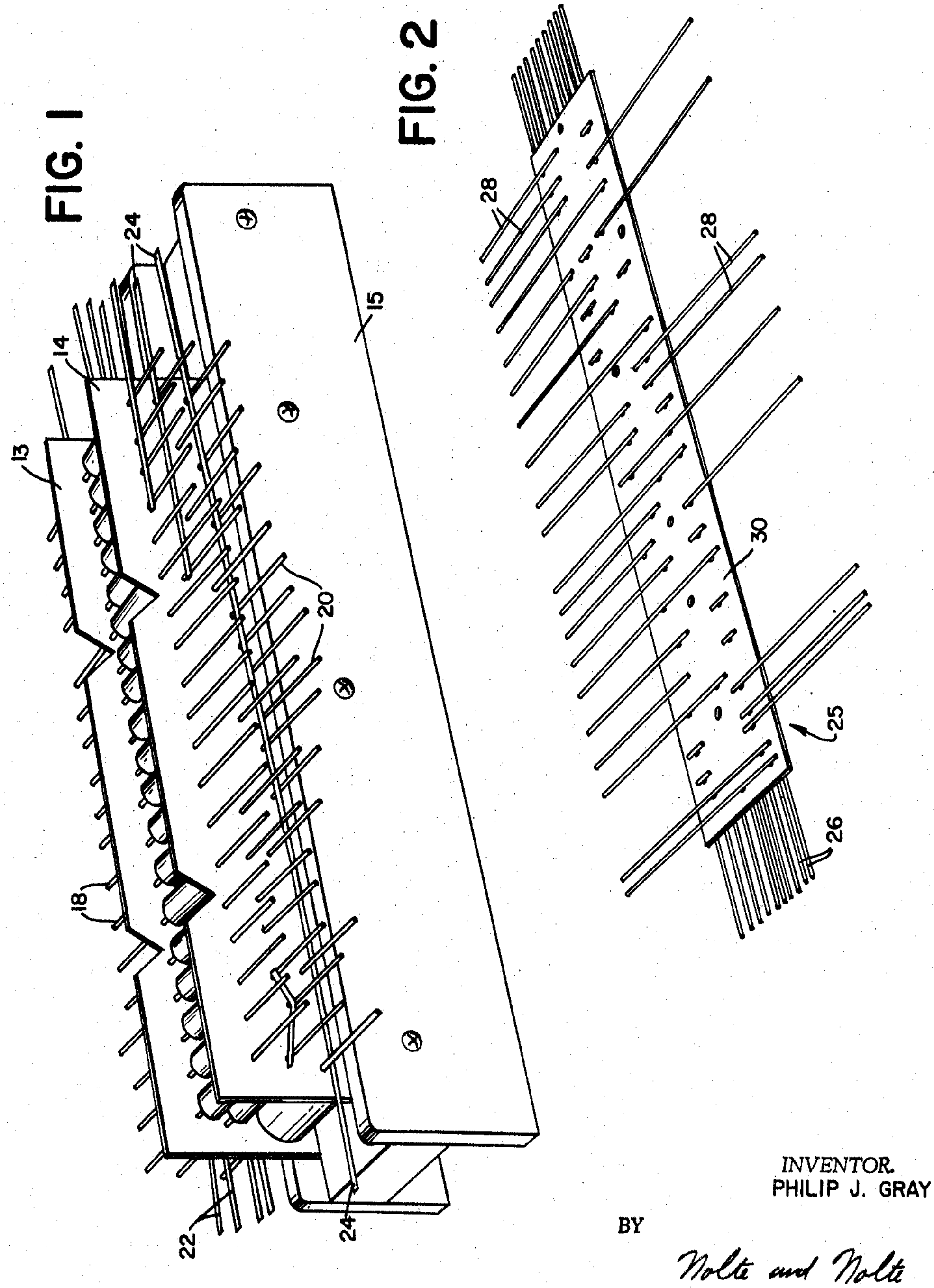
FIG. 1 is a perspective view of a partially completed assembly mounted in a jig.
FIG. 2 is a perspective view of a wiring panel.
Figures 3, 4, 5:
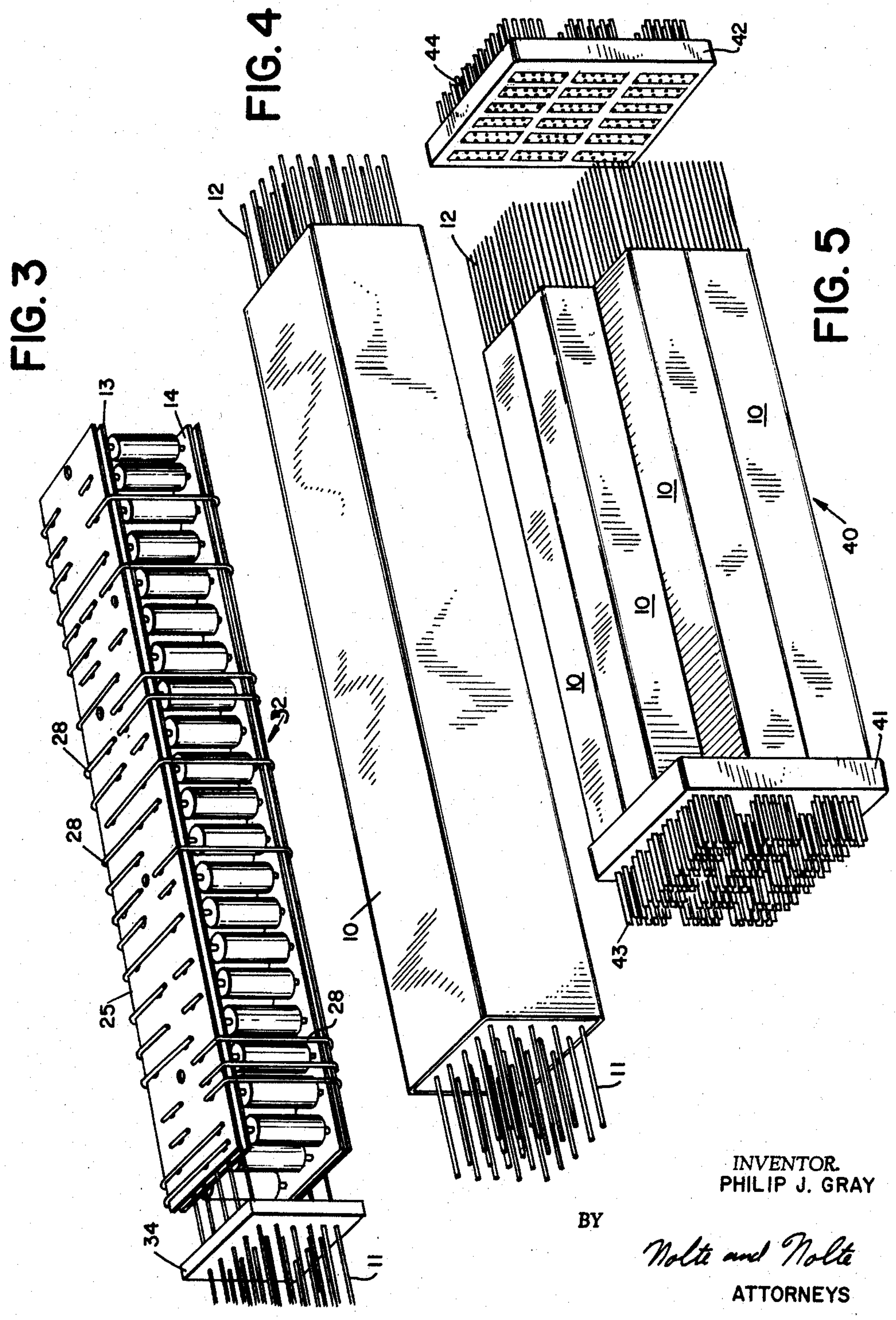
FIG. 3 is a perspective view of an assembly after the wiring panels have been added.
FIG. 4 is a perspective view of a potted assembly.
FIG. 5 is a perspective view of an array of potted assemblies including terminal boards.
Figure 6:
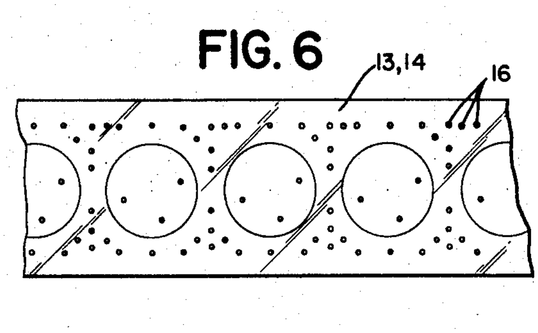
FIG. 6 is a view of a perforated insulating tape or film.
Figure 7:
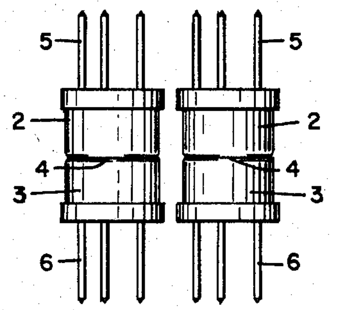
FIG. 7 is a view showing the arrangement of the transistors.

Referring to the drawings it will be seen that the electronic components are formed into an elongated stick 10 of rectangular cross section having wires or busses 11 and 12 extending from the ends of the stick. The components may include pairs of transistors 2, 3 (FIG. 7) glued or otherwise fastened together back-to-back at 4 with their leads 5, 6 extending in opposite directions. The pairs of transistors are arranged in spaced relationship in a long row. Around and between the transistors and mounted side-by-side in close and generally contiguous relationship are other electronic components such as semi-conductor diodes, capacitors and resistors. These components may be packed together as indicated in FIG. 1 and as shown in FIG. 4 of U.S. Patent No. 2,911,572, or FIG. 2 of application Serial No. 771,042. A pair of "Mylar" strips or films 13, 14 are placed in a holding jig 15 adapted to hold them in parallel spaced relationship. The insulating strips or positioning films 13, 14 are provided with perforations 16 for receiving all leads (see FIG. 6). The leads 18 and 20 of the components are inserted through the proper holes of the two films starting with the components on the bottom and working up and out to the edges of the package. This loading of the components between the flexible film is easily accomplished by the spreading of the film to allow component lead insertion through the perforations 16. Films 13 and 14 then hold the components and their leads in place and thus serve as a jig. Interconnecting wires 22 and 24 are then welded to selected leads for interconnecting the same and certain portions of wires 22 and 24 may be cut away after the welding operation to remove unnecessary portions of these wires, and leave the desired connections between selected leads. The welding, unlike soldering, can be effected close to the components without heat damage to the tightly packed components since welds are produced by a short current pulse.

A pair of preformed wiring panels 25 are provided. These wiring panels may each consist of a plurality of longitudinally extending wires 26 and a plurality of transversely extending wires 28 welded together at particular points. Certain portions of the wires 26 and 28 may be cut away to leave the desired connections. The connections between wires 26 and 28 are formed preferably by welding. Wires 26 and 28 are mounted on one or more perforated films 30 which are of the same material as films 13 and 14. If the wires 26 and 28 are on opposite sides of films 30 they may be welded together at the perforations. The wiring assemblies 25 are placed over the leads 18 and 20 with the wires 26 and 28 in spaced relationship to the wires 22 and 24. If desired, additional perforated films may be placed between the films 13 and 14 and the wiring panels 25 with leads 18, 20 passing through the holes of the additional films to insulate wires 26 and 28 from wires 22 and 24.

After the wiring panels 25 are placed on leads 18 and 20 and the leads are fed through the perforations of films 30 suitable connections are made between the leads and wires 26 and 28 by welding the same at the perforations in the films 30. The excess of leads 18 and 20 extending beyond the panels 25 may then be clipped off and the resultant assembly will then appear substantially as shown in FIG. 3. In this figure the assembly 32 is shown having its bus wires extending at one end through a terminal board 34.

The assembly 32 is then potted in a suitable insulating compound 36 to form the stick assembly 10 of substantially rectangular cross section with suitable bus wires 11 and 12 extending from the ends thereof. A plurality of such rectangular sticks 10 may be packed together into a two dimensional array 40 (FIG. 5). Terminal boards 41, 42 are then mounted on the ends of the array 40. The wires 11 and 12 are extended into perforations in the terminal boards 41, 42 and may be electrically connected to suitable terminals 43 and 44 on the terminal boards. Alternatively, the leads 11 and 12 may themselves form suitable terminals extending through and beyond terminal boards 41, 42. The stick assemblies 10 and the array 40 of stick assemblies when formed as described above have extremely high structural strength. The matrices of welded wire in two places and the closely stacked components in the third place act similarly to steel rods in reinforced concrete to form a very strong structure. It will be evident also that the assembly is extremely compact and of light weight and requires no auxiliary support of any kind.

Figure 8:
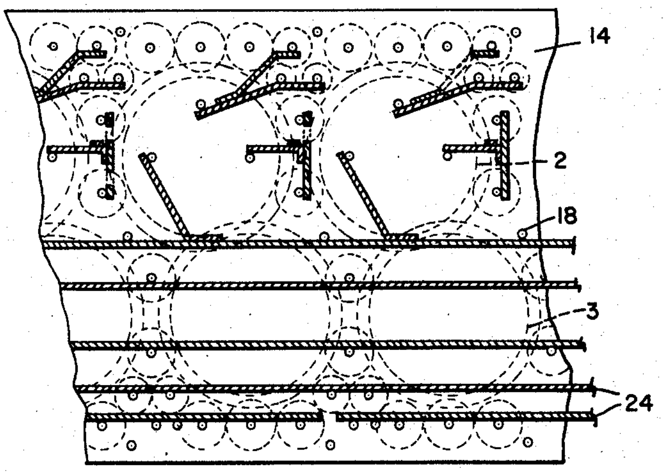
FIG. 8 is a partial side elevational view of the invention during one stage of construction.
Figure 9:
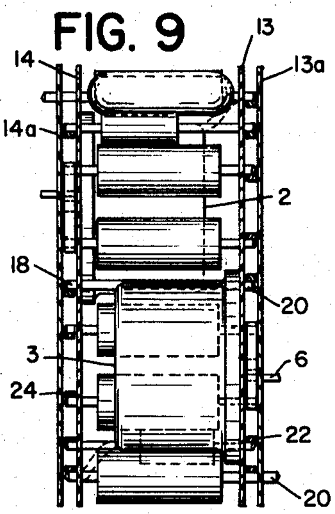
FIG. 9 is an end view of FIG. 8 showing the application of a second insulating film on each side of the package.

Referring to FIGS. 8 and 9, a modified configuration is shown. In this form, the transistors 2, 3 have been placed in overlaying relationship to create a flatter or more slab like package. This arrangement of the components allows closer spacing of the jigging sheets 13 and 14 and increases the wiring area available on each slab so that the interconnecting wiring may be adequately spaced. In these views, like numerals refer to like components in the previously described figures and it can be seen that an additional insulating sheet 13*a* and 14*a* has been applied over the first layer of welded interconnecting wires 22 and 24 thereby permitting the application of a second layer of interconnecting wires between component leads 18 and 20 which protrude therethrough. In this stage of fabrication as shown in FIGS. 8 and 9, it can readily be seen how the welding of the interconnecting conductors 22 and 24 has provided substantial rigidity to the electrical assembly. At this point in the construction the assembly may be removed from its holding jig 15 and the lower depending portions of the jigging strips 13 and 14 may be removed.

Figure 10:
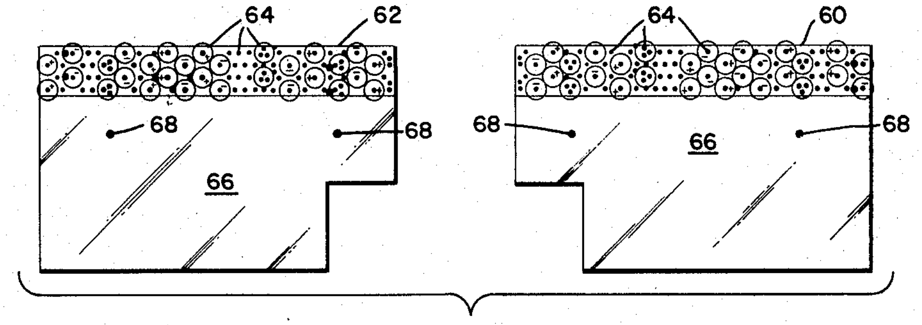
FIG. 10 is a view showing a pair of matching front and rear film jigs which include a lower depending portion used for attachment to a spacing block.

FIG. 10 shows front and rear jigging films respectively 60 and 62 similar to films 13 and 14. Each black dot 64 on the front and rear films represents the position of an aperture through which a component lead will be subsequently placed. The depending tab portions 66 of each film has located therein apertures 68 which correspond to the spacing of pins (not shown) located on the positioning jig 15. This arrangement of holes in the depending tab portion 66 assures accurate alignment of apertures 64 on the front and rear jigging films.

While the invention has been exemplified by showing and describing one illustrative example thereof, it will be apparent to those skilled in the art that many modifications and variations thereof can be made within the principles and scope of our invention. Accordingly, the invention is not to be construed as limited except as defined in the following claims.

What is claimed is:

1. An electrical assembly comprising a multitude of electrical components arranged side by side in contiguous relation and having substantially parallel wire leads extending from ends thereof, a pair of thin flexible perforated sheets of insulating film each extending along the ends of said components with all leads extending through the perforations to hold the components in fixed relation during subsequent electrical interconnection thereof, electrical connections extending between and welded to selected leads outside said sheets with the sheets between the welded connections and the components, a second pair of thin flexible perforated insulating film sheets extending adjacent and substantially parallel to the first pair of sheets outside said first sheets and the welded connections, with selected leads of the components extending through the perforations of the second sheets, and a third pair of thin flexible perforated insulating sheets each having a matrix of longitudinally extending wires on one side and a matrix of transversely extending wires on the other side thereof with the wires on the two sides of the third sheets intersecting at perforations thereof, component leads extending through the last mentioned perforations, and welds at said perforations between the last mentioned leads and the wires.

2. An electrical assembly according to claim 1, wherein said electronic components include at least a pair of transistors fastened back-to-back having leads extending from their front faces in opposite directions.

3. An electrical assembly according to claim 2, wherein each pair of transistors is closely surrounded by a plurality of resistors, capacitors and semi-conductor diodes.

4. An electrical assembly according to claim 1, including a terminal board at one end of the assembly connected to said longitudinally extending wires.

5. In combination, a plurality of electrical assemblies each according to claim 1, each of said assemblies being encapsulated in an insulating compound of rectangular cross section with longitudinal wires extending beyond the insulating compound, said assemblies being arranged side by side contiguously in a two dimensional array, and terminal boards connected to the longitudinal wires extending from the array.

6. An electrical assembly comprising a large number of electrical components arranged side by side close together and having wire leads extending from opposite ends thereof, a pair of perforated flexible insulating films each extending adjacent the ends of said components with the leads extending through the perforations to hold the components substantially rigid during subsequent electrical interconnection, electrical connections welded to selected leads extending therebetween outside said films with the films between the welded connections and the components, a second pair of perforated flexible insulating films extending adjacent and substantially parallel to the first pair of films, outside said first films and the welded connections, with selected leads of the components extending through the perforations of the second films, and a third pair of perforated flexible films each having a matrix of spaced conductors on one side of the film and a matrix of spaced conductors on the other side extending transversely of the conductors on said one side with the conductors on the two sides of the films intersecting at perforations thereof, component leads extending through the last mentioned perforations and welds at said perforations between the leads and the conductors.

7. An electrical assembly comprising a plurality of closely packed electrical components arranged side by side and having wire leads extending from opposite ends thereof, a pair of flexible insulating layers each extending adjacent the ends of said components with the leads extending through the layers to hold the components in fixed relation during subsequent electrical interconnection, electrical connections extending between and welded to selected leads outside said layers with the layers between the welded connections and the components, a pair of perforated flexible insulating films extending adjacent said layers outside the layers and the welded connections with selected leads of the components extending through the perforations of the films, and a pair of flexible panels of interconnected wires located outside said films and connected to said last mentioned selected leads.

8. An electrical assembly comprising a large number of closely packed electrical components arranged side by side and having wire leads extending from opposite ends thereof, a flexible insulating material extending across the leads at either end of said components with the leads extending through said insulating material to hold the components in fixed relation during subsequent electrical interconnection thereof, electrical connections extending between and welded to selected leads outside said insulating material to thereby secure said components to said insulating material, and a pair of perforated flexible films each having a matrix of longitudinally extending wires on one side of the film and a matrix of transversely extending wires on the other side thereof with the wires on the two sides of the films intersecting at perforations thereof, component leads extending through the last mentioned perforations, and welds at said perforations between the leads and the wires.

9. An electrical assembly comprising a large number of closely packed electrical components arranged side by side and having wire leads extending from opposite ends thereof, a flexible insulating material extending across the leads at either end of said components with the leads extending through said insulating material to hold the components in fixed relation during subsequent electrical interconnection thereof, electrical connections extending between and welded to selected leads outside said insulating material with the insulating material between the welded connections and the components, and a pair of flexible panels of interconnected wires located outside said insulating material with said wires connected to said leads.

10. An electrical assembly comprising a multiplicity of electrical components arranged side by side in contiguous relation and having leads extending from portions thereof, at least one thin flexible perforated sheet of insulating film each extending along the ends of said components with all leads extending through the perforations to hold the components in fixed relation during subsequent electrical interconnection thereof, certain electrical connections extending between and welded to selected leads outside said sheet with the sheet between the welded connections and the components, at least one thin flexible perforated insulating film sheet extending adjacent and substantially parallel to the first sheet outside said first sheet and the welded connections with selected leads of the components extending through the perforations of the second sheet, and other electrical connections extending between and welded to selected leads extending through said first mentioned perforated insulating film sheet.

References Cited in the file of this patent

UNITED STATES PATENTS

| | | |
|---|---|---|
| 1,939,130 | Mills | Dec. 12, 1933 |
| 2,857,558 | Fiske | Oct. 21, 1958 |
| 2,864,156 | Cardy | Dec. 16, 1958 |
| 2,902,628 | Leno | Sept. 1, 1959 |
| 2,912,748 | Gray | Nov. 17, 1959 |
| 2,929,964 | Rhys-Jones | Mar. 22, 1960 |
| 2,945,163 | Kilby | July 12, 1960 |

OTHER REFERENCES

Tape Cable Corporation, 790 Linden Avenue, Rochester 10, N.Y., Engineering Bulletin No. 9, pages 1–6.

Electronics, October 9, 1959, pages 62–65.